United States Patent
Townsend

[15] 3,701,242
[45] Oct. 31, 1972

[54] MANUAL FRUIT HARVESTER
[72] Inventor: Curtis J. Townsend, P.O. Box 374, Port Orange, Fla. 32019
[22] Filed: June 9, 1970
[21] Appl. No.: 44,819

[52] U.S. Cl. ............................................. 56/328 R
[51] Int. Cl. ............................................. A01g 19/00
[58] Field of Search ....... 56/328 R, 328 TS, 327, 330, 56/27.5, 30, 31, 32

[56] References Cited
UNITED STATES PATENTS

| | | | |
|---|---|---|---|
| 1,278,175 | 9/1918 | LeBaron | 56/330 |
| 1,364,670 | 1/1921 | Wofford | 56/32 |
| 3,210,921 | 10/1965 | Middlesworth et al. | 56/328 R |
| 3,396,521 | 8/1968 | McKibben et al. | 56/330 |
| 3,413,787 | 12/1968 | VanAntwerp et al. | 56/328 R |
| 3,478,501 | 11/1969 | Patxtaff | 56/330 |
| 3,522,697 | 8/1970 | Shaff | 56/330 |

Primary Examiner—Russell R. Kinsey
Attorney—Clarence A. O'Brien and Harvey B. Jacobson

[57] ABSTRACT

A manually manipulated device for removing fruit, particularly oranges or other citrus fruit, from the trees on which they grow by separating the fruit from the stems and collecting the dislodged fruit. The device includes a small portable motor having an offset longitudinally extending fruit engaging member which is rotated in a circular path in order to engage the fruit in a downward direction adjacent its connection with the stem for separating the fruit from the stem with the device also including an attached collection pan communicated through a hose with the source of vacuum or provided with a ground supported collection tray which underlies substantially one-half of a tree which also may be communicated with a source of vacuum from its lowest point.

8 Claims, 5 Drawing Figures

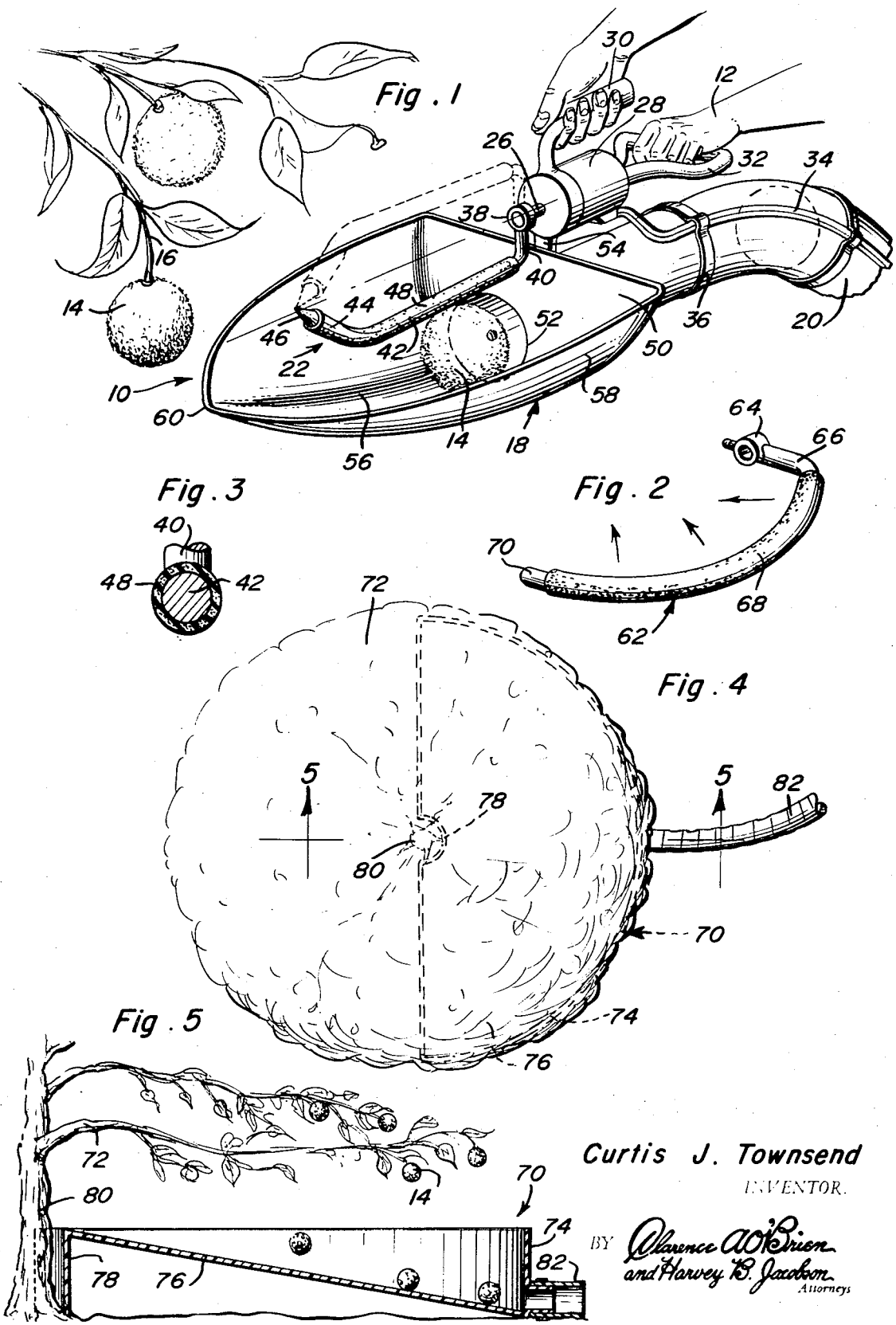

MANUAL FRUIT HARVESTER

The present invention generally relates to a device for harvesting citrus fruit, such as oranges from the trees by imparting a striking force of the fruit adjacent the stem thus separating the fruit from the stem and catching the fruit in a pan-type structure having an opening therein communicated with a source of vacuum to convey the fruit to a suitable collection receptacle or the like.

Heretofore, many apparatuses have been developed for harvesting fruit from trees. Such devices include machines which grasp and shake a complete tree or a portion thereof, gripping devices for engaging individual fruit for pulling it from the tree, rake-type devices such as shown in U.S. Pat. No. 3,447,293 issued June 3, 1969 and machines including a plurality of fruit engaging bars movable in a circular path as disclosed in my copending application, Ser. No. 826,833, filed May 22, 1969.

While previously known devices perform satisfactorily, at least, under some circumstances, it has been found that it is desirable to employ one of the basic principles disclosed in Ser. No. 826,833 in a manually manipulatable fruit harvester associated with a vacuum conveying system which conveys the picked fruit from a collecting pan to a suitable receptacle after the fruit has been separated from the stems by the harvester.

An object of the present invention is to provide a manual fruit harvester in the form of a portable motor having a fruit engaging bar driven in a circular path with the bar connected to and driven by the motor through an offset arm so that a person may manipulate the motor and fruit engaging bar so that it will engage the fruit adjacent the stem in a downward direction generally in the same relationship as disclosed in the machine in my copending application Ser. No. 826,833 for effectively separating the fruit from the stem and imparting a downward movement to the fruit for collection in a pan.

Another object of the invention is to provide a manual harvester in which the collecting pan is communicated with a collection receptacle through a flexible hose communicated with a suitable vacuum source for conveying fruit from the collection pan to the collection receptacle with the details of the conveying hose, collection receptacle, vacuum source and the like not forming a part of the present invention except for the association of a vacuum hose with a collecting pan of the present invention.

Another object of the invention is to provide a collecting pan in accordance with the preceding object in which the pan is a scoop-like device attached to the motor housing and manually manipulated therewith to maintain a constant relationship between the fruit engaging bar and the pan so that fruit dislodged by the bar will be directed or fall into the pan.

Another important object of the invention is to provide a fruit harvester in which the collecting pan is enlarged and disposed below the tree canopy for catching fruit dislodged by the fruit engaging member with the enlarged pan being communicated with a conveying hose communicated with a source of vacuum to convey the fruit to a receptacle.

Still another important feature of the present invention is to provide a manual fruit harvester in accordance with the preceding objects in which the fruit engaging member is covered with a resilient material to reduce damage to the limbs of the tree which it may engage during its circular movement.

Still another important feature of this invention is to provide a fruit engaging member movable in a circular path in which the central portion of the rod-like member is offset in relation to the rotational axis thereof to deflect fruit toward the center of rotation for facilitating catching of the fruit in the fruit collecting pan.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the manual fruit harvester of the present invention illustrating the manner in which the device is manipulated in relation to the canopy of an orange tree or the like.

FIG. 2 is an enlarged perspective view of a slightly modified form of fruit engaging member which is generally semi-elliptical in configuration.

FIG. 3 is a detailed sectional view, on an enlarged scale, of the fruit engaging member illustrating the resilient covering thereon.

FIG. 4 is a plan view of a fruit tree illustrating a ground supported collecting pan underlying substantially one-half of the area of the tree.

FIG. 5 is a sectional view taken generally along section line 5—5 of FIG. 4 illustrating the relationship of the collecting pan to the tree and the inclined structure thereof to direct fruit to a conveying hose.

Referring now specifically to the drawings, the manual fruit harvester of the present invention is generally designated by the numeral 10 and is manually manipulated by the hands 12 of a person engaged in removing fruit such as oranges 14 from the stems 16 on which they are suspended to enable the oranges 14 to be collected in a collection pan 18 having communication with a flexible conveying hose 20 communicated with a source of vacuum and a receptacle to convey the oranges 14 along the hose 20 into a suitable storage receptacle. The structural details of the hose, vacuum source and receptacle do not form part of the present invention and may be of any conventional structure and size.

The harvester includes a fruit engaging bar or member generally designated by numeral 22 which rotates in a circular path and engages the orange in a downward direction adjacent its point of engagement with the stem 14 in substantially the same manner as disclosed in my co-pending application Ser. No. 826,833.

The fruit engaging member 22 is supported and driven by an output shaft 26 of a portable motor 28 having handles 30 and 32 associated therewith. The handles 30 and 32 may be of any suitable type with the handle 32 preferably being of the loop-type attached to one end of the motor housing and the handle 30 preferably being offset to one side of the motor housing. It will be appreciated that the association of the handles 30 and 32 may be varied as desired. For example, both handles may be disposed laterally of the motor or both handles may be either disposed longitudinally of the rotational axis of the motor or only a single handle may be provided if desired. The motor 28 may be of any suitable construction but preferably is a relatively lightweight hydraulic motor such as a conventional orbit motor. The hydraulic motor 28 is provided with power through hydraulic lines 34 which may be attached to the hose 26 by supporting rings 36 or the like and one of the handles 30 and 32 may have a suitable control valve associated therewith for operating the motor 28.

The fruit engaging member 22 includes a central hub 38 anchored to the output shaft 26 by a suitable setscrew or the like with an offset arm 40 extending from the hub 38. An elongated rod 42 extends from the arm 40 in substantially parallel relation to the rotational axis and center line of an output shaft 26. The outer end of the rod 42 is inclined as at 44 back towards the center of rotation and the center line of the shaft 26 and terminates in a pointed end portion 46. Substantially the entire length of the rod 42 and the inclined portion 44 is covered with a resilient coating 48 of resilient material such as rubber, plastic or the like which will reduce the skinning of the stems and branches thereby reducing damage to the tree and also somewhat cushion the engagement of the rod or bar 42 with the fruit 14. As illustrated in dotted line in FIG. 1, the bar 42 moves in a circular path and as it so moves, the person manipulating the harvester will orient it so that the bar 42 will engage the fruit 14 adjacent its connection with the stem 16 thus imparting a downward striking force against the fruit 14 and discharging it from the stem and discharging it downwardly and inwardly toward the collecting pan 18.

The collecting pan 18 includes a rear wall 50 having an opening 52 formed therein adjacent the bottom center thereof. The rear wall 50 is rigidly attached to the motor 28 as by a bracket 54 and the hose 20 is attached to the periphery of the opening 52 in any suitable manner desired. The pan 18 also includes a curved bottom wall portion and upwardly curved side wall portions 58 all of which curve upwardly and outwardly to provide a scoop shaped pan having a generally rounded but pointed outer end 60 to facilitate insertion between branches, leaves and the like to enable the fruit engaging member 22 to be properly associated with the fruit 14.

The pan may be constructed of lightweight material such as various lightweight metals, plastics or the like including a glass fiber reinforced resin which together with the structure of the motor, hose and fruit engaging member will be sufficiently light in weight to enable the harvester to be manipulated for relatively long periods of time without undue fatigue of the person using the device.

FIG. 2 illustrates a modified form of the fruit engaging member or bar 22 which is generally designated by the numeral 62 and includes a hub 64, radially extending arm 66 and a generally semi-elliptical bar or rod 68 coated with a resilient material and provided with a free end 70 generally coinciding with the rotational axis and center line of the output shaft 26. This arrangement assures that forces imparted to the fruit 14 will be directed inwardly towards the center of the ellipse defined by rotation of the semi-elliptical member 68 about the rotational center of the shaft thereby further assuring that the pan 18 will catch the fruit dislodged by the fruit engaging member 62.

FIGS. 4 and 5 illustrate a modified form of collecting pan which is an enlarged pan supported below a major portion of the canopy of a fruit tree 72 for collecting fruit 14 dislodged therefrom. This pan may be employed in lieu of the pan 18 or it may be employed in addition to the pan 18 to catch any fruit that may have been missed by the pan 18. The enlarged pan 70 is generally semi-circular in configuration and provided with a semi-circular upstanding outer wall 74 provided with an inclined bottom 76 which is also semi-circular and inclines upwardly from the center of the peripheral wall 74 to a point generally merging with the ends of the wall 74 which has the lower edge thereof joined with and terminating integral with the peripheral edge of the bottom wall 76. The center of the diametric edge of the bottom wall 76 is provided with a depending U-shaped wall 78 which defines a recess in the diametric edge of the bottom wall 76 for receiving the tree trunk 80. Otherwise, the diametric edge of the bottom wall 76 is provided with a vertical supporting wall which supports the diametric edge of the bottom 76 and the ends of the peripheral wall 76 to provide gravity movement of oranges 14 dropping onto the bottom wall 76 toward the center and bottom of the outer wall 74 as illustrated in FIG. 5. The bottom center of the semi-cylindrical wall 78 is connected with and communicate with a vacuum conveying hose 82 similar to the hose 20 and which may be communicated with a storage receptacle and source of vacuum for operation in the same manner. Any suitable means may be provided for connecting the hose 82 to the wall 74 so that as oranges 14 roll down the bottom wall 76 they will also roll toward the center of the wall 74 due to the arcuate curvature thereof whereby the oranges will then be conveyed along the hose 82 into a suitable receptacle. This device may be of one-piece construction and is preferably constructed of a lightweight metal, plastic or the like including glass fiber reinforced plastic which renders the device relatively light in weight and capable of being moved and positioned by a single person. With the enlarged pan, the pan 18 and hose 20 may be dispensed with thus enabling the person to utilize only the motor and the fruit engaging member 22 or 62 with, of course, the power supply hoses 34 connected to the motor for supplying power thereto. With this arrangement, the oranges may be dislodged from the tray and will be collected due to the oranges being directed inwardly and downwardly by engagement of the fruit engaging member therewith adjacent the stem to exert a downward force thereto and also due to the force of gravity.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fruit harvester comprising a portable motor, having an output shaft, an offset fruit engaging member connected with the output shaft for movement in a circular path to engage fruit adjacent its connection with fruit supporting stems for disconnecting the fruit from the stem, and handle means associated with the portable motor to enable manual manipulation thereof for positioning the harvester in relation to the fruit being harvested.

2. The structure as defined in claim 1 wherein said fruit engaging member is in the form of an elongated rod having an inturned outer end portion generally extending to the center of rotation of the fruit engaging member and an offset arm at the inner end thereof for connection with the output shaft for supporting the fruit engaging member from the motor.

3. The structure as defined in claim 2 wherein said rod is substantially straight from the offset arm to the inturned end thereof.

4. The structure as defined in claim 2 wherein said rod, arm and inturned end of substantially semi-elliptical end configuration for imparting movement to the fruit for directing it towards the center of rotation of the fruit engaging member.

5. The structure as defined in claim 1 together with a fruit collecting pan supported from said motor in underlying relation to the fruit engaging member for receiving fruit dislodged from the stems, and a hose connected with the bottom of the pan and communicating with the interior thereof for receiving fruit from the pan, said hose adapted to be communicated with a source of vacuum and storage receptacle for conveying fruit from the pan.

6. The structure as defined in claim 1 together with a pan for receiving fruit dislodged by the fruit harvester, said pan including an inclined bottom, a hose communicated with the inclined bottom and receiving fruit therefrom, said hose adapted to be communicated with a source of vacuum and a storage receptacle for conveying fruit from the pan, said pan being substantially semi-circular and having a circumferential and radial dimension to underlie substantially one-half of the canopy of a fruit tree to receive fruit dislodged from that portion of the fruit tree.

7. The structure as defined in claim 1 wherein said motor is in the form of a hydraulic motor, said handle means including two handles mounted on the motor in spaced relation to provide for manipulation of the harvester.

8. The structure as defined in claim 1 wherein said fruit engaging member includes a rod-like structure having a covering of resilient material thereon to reduce damage to the tree limbs, stems and fruit.

* * * * *